United States Patent [19]
Triola et al.

[11] Patent Number: 5,740,719
[45] Date of Patent: Apr. 21, 1998

[54] COFFEE MACHINE FOR USE WITH SHELF-STABLE LIQUID COFFEE CONCENTRATE

[76] Inventors: Gary Triola, 71097 Hwy. 41, Pearl River, La. 70452; Paul Gremillion, 210 Elmwood St., Slidell, La. 70460

[21] Appl. No.: 753,424

[22] Filed: Nov. 25, 1996

Related U.S. Application Data

[63] Continuation-in-part of Ser. No. 617,059, Nov. 12, 1996, abandoned.

[51] Int. Cl.$^6$ .................................................... A23F 3/00
[52] U.S. Cl. ........................ 99/302 R; 99/275; 99/279; 99/323.3
[58] Field of Search ..................... 99/279, 275, 323.3, 99/292, 297, 300, 302 R, 302 P

[56] References Cited

U.S. PATENT DOCUMENTS

| | | | |
|---|---|---|---|
| 2,881,692 | 4/1959 | Volcov | 99/302 R |
| 3,532,505 | 10/1970 | Cornelius | 99/282 X |
| 3,537,384 | 11/1970 | Stauber | 99/302 R |
| 3,641,918 | 2/1972 | Schellgell | 99/300 |
| 4,470,999 | 9/1984 | Carpiac | 99/275 X |
| 5,240,722 | 8/1993 | Louridas | 99/302 R |

*Primary Examiner*—Reginald L. Alexander
*Attorney, Agent, or Firm*—Kenneth L. Tolar

[57] ABSTRACT

A coffee machine for use with shelf-stable liquid coffee concentrate which includes a built-in storage reservoir that doubles as a hydraulic cylinder to deliver the requisite amount of shelf-stable liquid coffee concentrate into the brewing chamber. The machine allows heated water to mix with the concentrate in both the brewing chamber and the mixing chamber and then collect in a carafe. The machine allows for the fast and economical brewing of coffee in the home or office using shelf-stable liquid coffee concentrate that does not require the use of coffee filters and coffee grounds.

7 Claims, 2 Drawing Sheets

5,740,719

COFFEE MACHINE FOR USE WITH SHELF-STABLE LIQUID COFFEE CONCENTRATE

This application is a continuation-in-part of patent application Ser. No. 08/617,059, filed Nov. 12, 1996, now abandoned.

BACKGROUND OF THE INVENTION

1. Field of the Invention

The present invention relates to a new coffee machine that is capable of brewing coffee in the home or office using shelf-stable liquid coffee concentrate. The new coffee machine resembles a typical counter top automatic drip coffee maker which usually have a mixing chamber for receiving and storing coffee grounds and a filter. In addition, the present invention comprises a small cylindrical brewing chamber received within the mixing chamber. The brewing chamber is in communication with a shelf-stable liquid coffee concentrate storage reservoir which receives a plunger type device that when depressed, can deliver a desired amount of shelf-stable liquid coffee concentrate to the brewing chamber. In the brewing chamber, hot water is mixed with liquid coffee concentrate where it then exits into the mixing chamber and drips into a carafe for storage.

2. Description of the Prior Art

The prior art consists of large commercial machines made by American Metal Ware/Grindmaster, Models LC/1002 E, LC/001E, that brew up to 1380 cups of coffee per hour by siphoning the shelf-stable liquid coffee concentrate from a pre-filled bottle using peristaltic pumps and tubing. It is then metered into a brewing compartment where it is mixed with hot water. It then falls through a Tomlinson valve faucet into a coffee cup. This machine is too expensive and impractical for use in a home or office.

The American Metal Ware/Grindmaster machines requires no coffee filters or grounds and provides a fast, easy and uncomplicated method of brewing shelf-stable liquid coffee concentrate. As such, there is an unrecognized need for an uncomplicated, inexpensive counter-top machine capable of brewing shelf-stable liquid coffee concentrate for use in homes and offices. Other coffee machines currently in use are not capable of brewing coffee in the home or office using shelf-stable liquid coffee concentrate.

U.S. Pat. No. 3,641,918 issued to Schellgell and Torke discloses a coffee maker for brewing coffee from liquid coffee concentrate. The maker uses a different coffee concentrate formulation which must remain chilled. Therefore, the coffee maker requires a refrigerating chamber to store the coffee concentrate. The water that is mixed with the coffee concentrate is heated prior to mixing to enhance the flavor. Unlike the present invention, a pump is required to deliver the coffee concentrate to a mixing chamber where it is mixed with water. Furthermore, the machine is only capable of making one cup of coffee at a time.

U.S. Pat. No. 3,537,384 issued to Stauber discloses a machine for making coffee, tea or similar beverages. The inventive feature of the machine is that it allows the supply of a precisely controlled amount of hot water so that the volume or concentration of the beverage to be made may be varied. This machine is not capable of producing coffee from shelf-stable liquid coffee concentrate.

U.S. Pat. No. 5,240,722 discloses a prepared package for making a hot beverage such as coffee, tea or soup. A commercially available boiler is connected to the package so that hot water can contact the beverage ingredients. The finished product is dispensed through a spout located at the bottom of the package Finally, U.S. Pat. No. 2,881,692 issued to Volcov discloses an electric apparatus of automatically pulsating action for preparing infusions through distillation. The device contains a differential boiler which produces steam and condensate to be mixed with granulated material such as coffee. The machine is capable of preparing a substantial amount of coffee or a single cup depending on the desired amount. The apparatus also is designed to use electric current only when in use.

SUMMARY OF THE INVENTION

The present invention relates to a coffee maker that is capable of brewing coffee in the home, office or in other similar small volume applications using shelf-stable liquid coffee concentrate. The coffee maker resembles a typical automatic drip coffee maker generally known in the prior art. In addition, the present invention comprises a cylindrical brewing chamber that is in fluid communication with a shelf-stable liquid coffee concentrate storage reservoir. A plunger is received within the storage reservoir for delivering a desired amount of liquid coffee concentrate to the brewing chamber.

Hot water is delivered to the brewing chamber in the same manner as in typical household coffee makers. Water flows from a storage reservoir to a boiler section. The boiler section is essentially a heating element located beneath the carafe. The water is heated in the boiler section and rises through tubing to spray holes located above the brewing chamber. In the typical counter top machine, the spray holes are arranged circumferentially around the mixing chamber to facilitate mixing with the coffee grounds and to ensure even water distribution across the filter. In the present invention, preferably all but a few holes are plugged or omitted to direct most, if not all, of the water flow directly to the brewing chamber. The spray holes deliver the hot water to the brewing chamber where it mixes with liquid coffee concentrate. After brewing, the heating element maintains the coffee in the carafe at a constant temperature.

Another object of the present invention is to provide a new and improved method of brewing coffee in a small, economical machine that eliminates the need for coffee grounds or filters so that cleaning of the machine is not required and waste disposal from the process is eliminated.

DESCRIPTION OF PREFERRED EMBODIMENT

Figure 1:
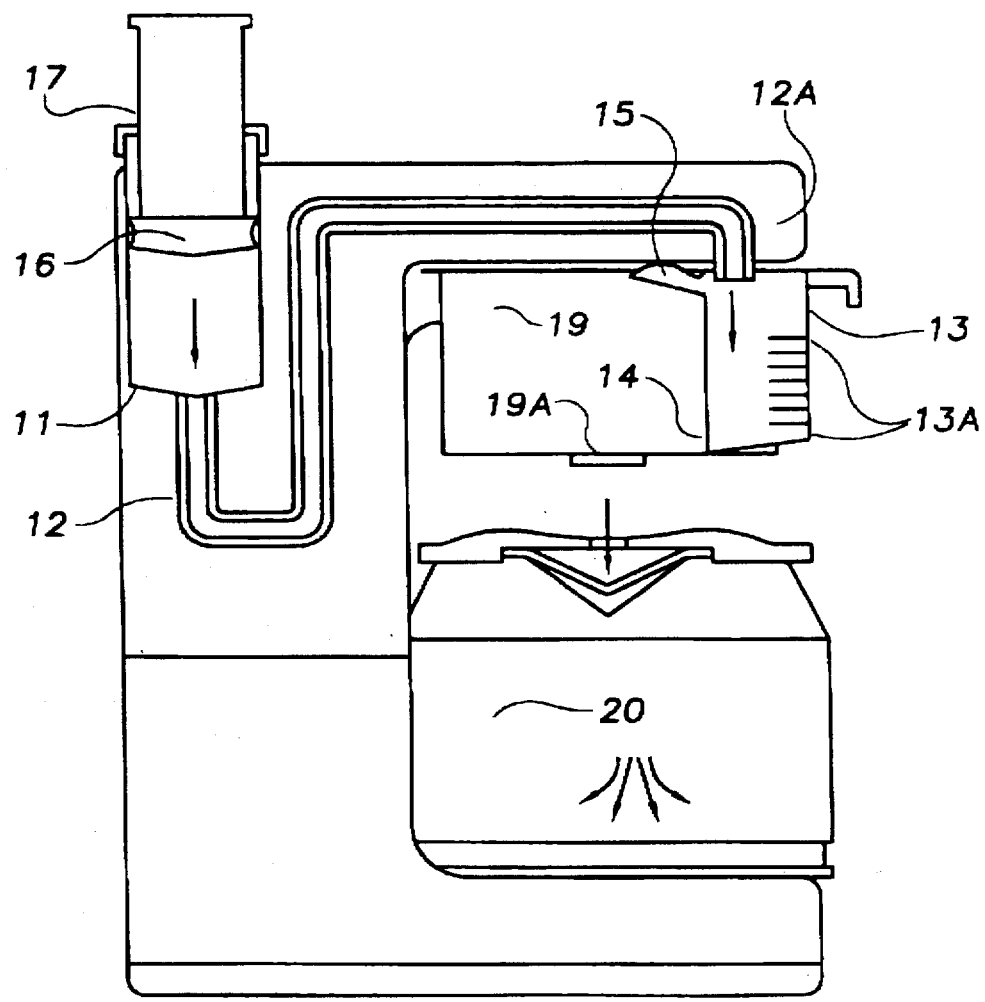
FIG. 1 shows a side view of an average counter-top coffee maker showing internal view of tubing running from the shelf-stable liquid coffee concentrate to the brewing chamber.
Figure 2:
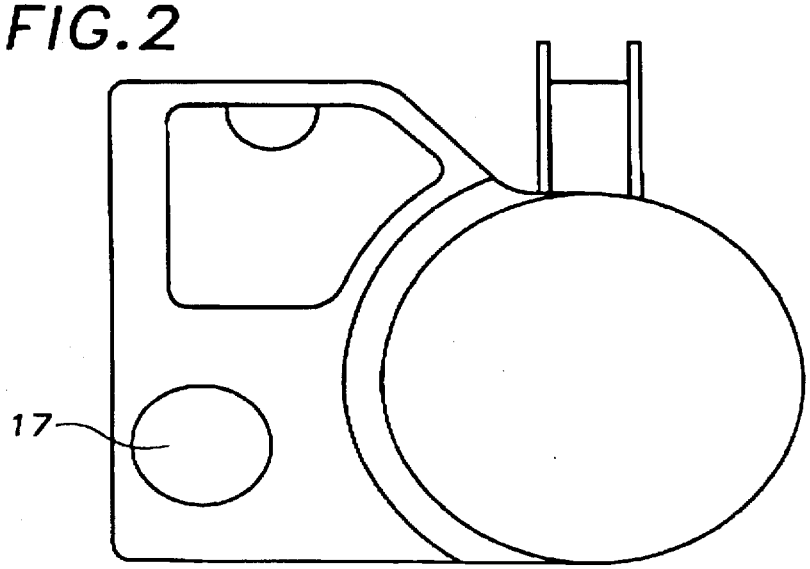
FIG. 2 shows a top view of the coffee maker.
Figure 3:
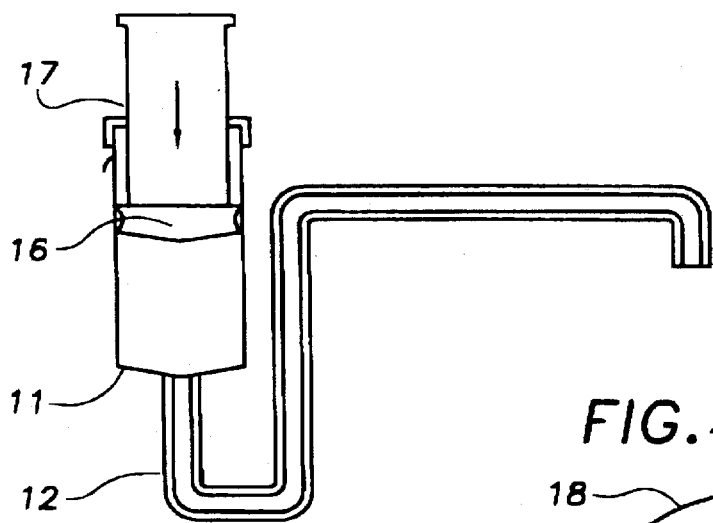
FIG. 3 shows a side view of the liquid concentrate storage reservoir, plunger and tubing.
Figure 4:
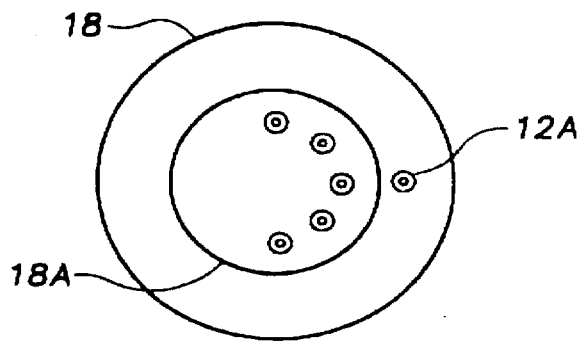
FIG. 4 shows a view looking up from the base revealing the holes (18a) from which the heated water for brewing flows out and the tube end (12a) from which the liquid coffee concentrate flows into the brewing chamber.
Figure 5:
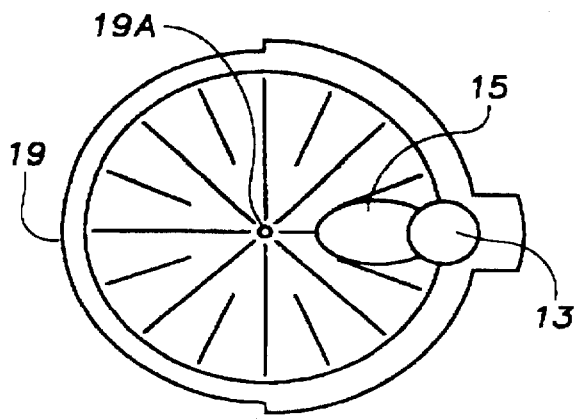
FIG. 5 shows a top view of the mixing chamber and brewing chamber.
Figure 6:
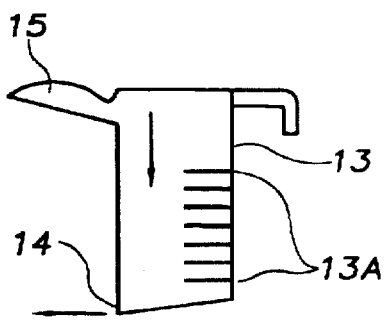
FIG. 6 shows a side view of the brewing chamber.

And now referring to FIGS. 1 thru 6, the present invention relates to a coffee maker suitable for smaller volume applications such as in a home or office that makes coffee using shelf-stable liquid coffee concentrate. Household automatic drip coffee machines are generally known in the prior art. These devices typically comprise a substantially C-shaped housing having a horizontally extending upper portion and a water storage reservoir received therein. Attached to the bottom surface of the horizontally extending upper portion of the housing is a hollow substantially conical-shaped, mixing chamber 19 in which a coffee filter and coffee grounds are typically placed. The mixing chamber has an aperture 19A on its bottom surface.

In these conventional prior art devices, coffee is placed in the mixing chamber 19, water is placed in the reservoir and the unit is activated with a switch. Water is heated and rises through tubing to spray holes 18A circumferentially arranged about the horizontally extending upper portion of the housing above the mixing chamber. Thus, the heated water rises to the spray holes 18A and is diffused across the surface of the coffee grounds resting on the filter. The resulting coffee then drips through the filter and into a carafe 20.

The present invention relates to a modification to these type of typical automatic drip coffee machines allowing them to brew coffee using shelf-stable liquid coffee concentrate as described in more detail below. Received within the mixing chamber 19 is a hollow cylindrical brewing chamber 13. The brewing chamber 13 has an open end, an exterior surface, a bottom surface and an aperture 14 on its bottom surface. Integral with said top end is an flared lip 15 outwardly extending therefrom which assists in capturing hot water as it exits the spray holes 18A. On the exterior surface of the brewing chamber 13 are a plurality of calibrations 13A corresponding to the amount of coffee to be brewed therein, i.e., one cup, two cups, four cups, ten cups, etc.

In the preferred embodiment, the spray holes 18A are located immediately above the open end of the brewing chamber 13 and/or flared lip 15 so that water drips into the brewing chamber 13 as opposed to the mixing chamber 19. Accordingly, some of the circumferentially placed holes 18A that appear on the typical drip type makers are plugged or omitted.

Integral with the coffee maker is a cylindrical hollow shelf-stable liquid coffee concentrate storage reservoir 11 having an open end and an aperture at a distal end. Attached to said aperture is a tube or similar conduit means 12. A distal end of said conduit means 12A is received within the open end of said brewing chamber 13 allowing the storage reservoir 11 and the brewing chamber 13 to be in fluid communication.

Vertically received within the open end of the shelf-stable liquid coffee concentrate storage reservoir 11 is a removable plunger type means 17 or a similar device. In the preferred embodiment, the storage reservoir 11 is of sufficient size to receive and store a quantity of shelf stable liquid coffee concentrate capable of producing approximately eighty cups of coffee. As a result, approximately six to eight full pots of coffee may be brewed without refilling the storage reservoir 11. However, smaller or larger sizes may be used as well.

Using the device as described above, coffee may be made in the following manner. A predetermined amount of water is placed in the water storage reservoir. The storage reservoir is filled with a predetermined amount of shelf-stable liquid coffee concentrate. The plunger means 17 is depressed until the desired amount of coffee to be brewed, as indicated by the calibrations, is delivered to the brewing chamber 13. The coffee maker is activated with the appropriate switch at which time hot water is then delivered to the spray holes 18A.

Preferably most, if not all, of the hot water drips directly into the brewing chamber 13 where it mixes with the shelf-stable liquid concentrate therein. The resulting mixture exits the bottom of the brewing chamber through the aperture 14 and drains into the mixing chamber 19. The mixture then flows through the aperture 19A on the bottom surface of the mixing chamber 19 and into the carafe 20 for storage. From the above description, it is now apparent that the new invention provides a new coffee maker that is capable of brewing coffee using shelf-stable liquid coffee concentrate. More particularly the invention is capable of brewing coffee using shelf-stable liquid coffee concentrate in smaller volume applications such as a home or office. It is understood that although there has been shown and described a preferred embodiment of the described present invention that modifications may be made to the invention which do not exceed the scope of the appended claims.

We claim:

1. A coffee machine capable of brewing coffee in the home or office using shelf-stable liquid coffee concentrate comprising:

a shelf-stable liquid coffee concentrate storage reservoir;

a brewing chamber having an external surface;

means for manually delivering a selectively, variable quantity of liquid coffee concentrate from said storage reservoir to said brewing chamber; means for delivering a predetermined amount of water, to produce a desired quantity of coffee.

2. A coffee maker according to claim 1 further comprising:

means for measuring the quantity of shelf-stable liquid coffee concentrate delivered to the brewing chamber.

3. A coffee machine according to claim 1 wherein said means for manually delivering shelf-stable liquid coffee concentrate from said storage reservoir to said brewing chamber comprises:

a plunger received within said shelf-stable liquid coffee concentrate storage reservoir whereby shelf-stable liquid coffee concentrate is delivered to the brewing chamber when the plunger is depressed.

4. A coffee machine according to claim 3 wherein said means for delivering shelf-stable liquid coffee concentrate to the brewing chamber further comprises:

a conduit in fluid communication with both the storage reservoir and the brewing chamber so that when the plunger is depressed, the shelf-stable liquid coffee concentrate is forced from the reservoir through the conduit and into the brewing chamber.

5. A coffee maker according to claim 2 wherein said means for measuring the amount of coffee delivered to the brewing chamber comprises:

a plurality of calibrations on the exterior surface of said brewing chamber.

6. A coffee machine according to claim 1 wherein said brewing chamber further comprises an open end.

7. A coffee machine according to claim 6 further comprising:

a plurality of hot water spray holes disposed on said coffee maker and above said brewing chamber proximal to its open end;

a flared lip integral with said brewing chamber proximal its open end to increase the horizontal surface area of said open end whereby the open end can receive an increased volume of hot water as the hot water exits said spray holes.

* * * * *